United States Patent [19]

Ramel et al.

[11] 4,365,517
[45] Dec. 28, 1982

[54] LINEAR DIFFERENTIAL FOUCAULT CURRENT DETECTOR SERVING FOR MEASURING SMALL DISPLACEMENTS OF A METALLIC ELEMENT

[75] Inventors: François Ramel, Levallois; Alain Rousseau, Paris, both of France

[73] Assignee: Effa Etudes, France

[21] Appl. No.: 224,506

[22] PCT Filed: Mar. 11, 1980

[86] PCT No.: PCT/FR80/00034
§ 371 Date: Nov. 12, 1980
§ 102(e) Date: Nov. 10, 1980

[87] PCT Pub. No.: WO80/01951
PCT Pub. Date: Sep. 18, 1980

[30] Foreign Application Priority Data

Mar. 12, 1979 [FR] France ............................. 79 06206

[51] Int. Cl.³ .......................... G01D 5/20; G01L 9/10
[52] U.S. Cl. .......................... 73/722; 73/728; 336/30
[58] Field of Search ................ 73/722, 728; 336/30

[56] References Cited

U.S. PATENT DOCUMENTS

| | | | |
|---|---|---|---|
| 2,959,962 | 11/1960 | Epstein | 73/728 |
| 3,336,525 | 8/1967 | Church | 336/30 |
| 3,995,493 | 12/1976 | Nishihara | 336/30 |

FOREIGN PATENT DOCUMENTS 509800 9/1976 U.S.S.R. .................. 73/728

Primary Examiner—Donald O. Woodiel
Attorney, Agent, or Firm—William A. Drucker

[57] ABSTRACT

Detector comprising two windings (1,2) disposed in two ferrite half-pots (3,4) opposite to two non-ferromagnetic metallic elements (5,6) one at least of which is movable. A pulse generator (9) feeds the two windings through resistances (7,8) coupled to a reference potential.

Two circuits (10,11) detect the peak values of the resultant signals at the common points between the windings and their charging resistance. An operational amplifier (12) creates the difference of these peak values. A diode (13) permits the discharge of the windings through the resistances (7,8).

Application to detectors of differential pressure, and to devices for the measurement of displacements.

9 Claims, 8 Drawing Figures

LINEAR DIFFERENTIAL FOUCAULT CURRENT DETECTOR SERVING FOR MEASURING SMALL DISPLACEMENTS OF A METALLIC ELEMENT

The invention relates to Foucault current detectors for displacements or approach.

These, generally intended for the measurement of dimensions or the counting of metallic elements, are constituted in the prior art by an oscillator of which the windings represent the sensitive face. The passage of a conductive metallic mass in the alternating magnetic field created by the oscillator has the effect of generating currents induced in the metallic mass. The oscillator is adjusted in such a manner that the supplementary charge which results stops its operation: the device is thus a proximity detector and not a detector providing a linear signal as a function of displacement.

The present invention proposes to provide a linear detector adapted to measure very small displacements (not exceeding a fe millimeters) with a high resolution (of the order of 1/10th of a micron for example), and a good insensibility to thermal variations and electrical parasitics. Such a detector, adapted to carry out industrial measurements (levels, outputs, pressures or others) must present great simplicity of manufacture and construction.

The detector according to the invention comprises two substantially identical windings one at least of which cooperates with a conductive element the displacements of which are to be measured, means for applying to these windings respectively, in series with two resistances, rectangular signals at low frequency, means for detecting the peak values of the voltages respectively received at the common points between the respective windings and the corresponding resistances, and means for determining the difference between these peak values, and is characterised, in combination, in that the said element is of non-ferromagnetic metal, that the two windings are directly coupled to a common point of application of the said signals, and that a free wheel diode couples the said common point to the common point of the resistances.

According to a preferring embodiment, the said rectangular signals are generated by a multivibrator and applied to the base of a transistor coupling the common point of the two windings to earth, a continuous reference voltage being applied to the common point of the resistances.

Other features, as well as the advantages of the invention will appear clearly in the light of the following description:

Figure 1:
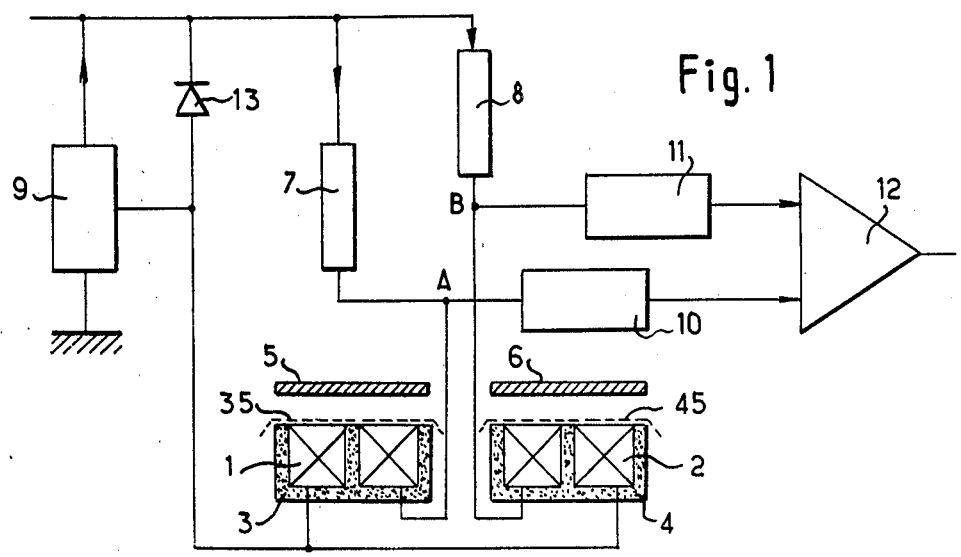
FIG. 1 shows schematically a detector device in accordance with the invention.

In FIG. 1 there are shown two identical windings 1 and 2, disposed in two Ferrite half-pots 3 and 4 intended to concentrate the lines of force directed towards two identical conductive metallic elements 5 and 6, one of which is for example fixed and the other of which is that of which it is intended to measure the displacements. These elements have for example a thickness comprised between 2/10ths of a millimeter and 1 millimeter.

A pulse generator 9 provides rectangular signals of predetermined frequence and cyclic ratio which are applied to the windings through charging resistances 7 and 8 respectively.

The points A and B common to the respective resistances and to the corresponding windings are coupled to two inputs of a differential amplifier 12, by means of two peak detector circuits 10 and 11 respectively. A diode 13 of the kind known as "free wheel" couples the common point of the windings to the common point of the resistances, in such a manner as to permit the discharge of the windings through the resistances, during the intervals between the pulses.

The assembly constituted by a winding and its charging resistance constitutes an integrating circuit for the controlling rectangular signal; such a circuit is very insensitive to electrical parasitics and has a high efficiency. A derivative circuit providing narrow pulses of large amplitude would not be satisfactory in practice.

The respective values of the charging resistances R, the inductance L of the windings and the frequency f of the rectangular signal, must be such that $3 \times L/R$ is less than f. Beyond that, there would appear a saturation phenomenon, the recieved signals tending towards the control signals.

The metal constituting the elements 5 and 6 is non-ferromagnetic, for example aluminium, beryllium-bronze, or stainless steel, such as the alloy Z8CNT18. The lines of force originated by each winding develop at its surface, according to Lenz's Law, induced currents which tend to open these lines of force. As a consequence, the more the element approaches the winding, the more the inductance of the winding decreases, from which there is an increase of the peak signal measured. If the metal was ferromagnetic, it would have the tendency to reclose the lines of force and to increase the inductance of the winding when approaching thereto. Experience shows that there would nevertheless be developed, on a ferromagnetic metal, Foucault currents the effect of which would be negligible at the very low frequencies and becoming preponderant at higher frequencies, of the order of some hundreds of KiloHerz. But, contrary to the effect of the Foucault currents, the effect proper to ferromagnetic metals is very dependent upon temperature, to the extent that the employment of a ferromagnetic metal must finally be excluded in practice.

The signal provided to the windings is a low frequency signal, between some KiloHerz and some tens of KiloHerz. There is found for each metal a peak of sensitivity as a function of frequency, and an evolution of this sensitivity at each side of the peak, the explanation of which appears very complex. For aluminium for example this peak is at about 30 KiloHerz, the sensitivity dropping from 50 KiloHerz to become nil at 100 KiloHerz.

It is advantageous if the two elements are constituted of the same metal. In effect, the curves of variation of the two peak voltages received at A and B as a function of the displacement will then undergo the same evolution as a function of temperature, which avoids the presence of a thermal resultant of the difference of these two voltages.

The mounting of the windings in an open Ferrite magentic circuit has the result of eliminating the influence of temperature on the structure of the lines of force and on the free-run inductance of the windings, which again reduces the thermal resultants of the detector.

There has been indicated by a broken line (respectively 35,45) a screen constituted by a sheet of an alloy for protection of the winding against any fluids which might be corrosive. Such an alloy will have to have the property of being entirely transparent to the lines of force at the frequency of operation of the detector. "Inconel" possesses such properties.

For a given displacement of a given piece of a metal, it is always possible to obtain a linear signal as a function of the displacement by taking into account the disposition of the windings and the cyclic ratio of the signal. In practice, the distance of each winding to the corresponding metallic element is principally adjusted in order that the operation takes place about an appropriate point of the curve which is representative of the peak voltage at A (respectively at B) as a function of distance; for this zone of operation the differential voltage will be substantially linear as a function of displacement. This adjustment of the circuit is easier and the thermal resultant is more reduced when the windings have substantially the same ratio between inductance and the square of the number of windings (that is what it was intended to convey in saying that they should be "substantially" identical).

The drawing shows in section a detector intended to measure the displacement of a single conductive element 20 (of aluminium, for example) under the effect of a difference of pressure at each side of an elastomeric membrane 21 with which it is integral. Two windings 22 and 23 are placed one at each side of the element 20, the maximum amplitude of displacement of which is, by way of example, 1 millimeter to each side of the zero position, in which the element 20 is at a distance of 3 millimeter from the windings. There is obtained in this case a linear signal as a function of displacement, for a cyclic ratio of 0.4 of the rectangular signal (the electrical circuit is that of FIG. 1).

Figure 3:
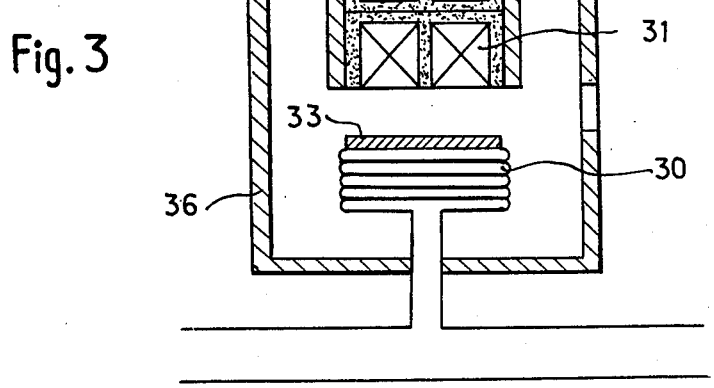
FIG. 3 shows a variant in which the two windings are disposed opposed to two separate metallic elements.

FIG. 3 shows in section a detector measuring the displacement, of a bellows 30, which is reprensentative of the pressure existing in this bellows.

Two windings 31 and 32 are respectively disposed opposite to a ring of aluminium, integral with the bellows and with another element 34 of the same nature. At rest, the element 33 is at a distance of the order of 0.5 millimeters from the winding 31 and, when it has undergone its maximum displacement, the element 33 is at a distance of the order of 0.1 millimeter from the winding 31. The cyclic ratio of the rectangular signal 10 which gives a linear signal as a function of the displacement is 0.45 (the electrical circuit is that shown in FIG. 1).

As will be seen with the aid of these examples, the operation of the detector of the invention is simple, and its manufacture simplified. The differential principal of the measurement permits avoiding of a very rigorous centering of the windings with respect to the metallic element or elements, the inaccuracies of placement being corrected for by the adjustment of the operational point disclosed above.

The circuit of FIG. 3 is particularly adapted to the construction of a detector of high pressures (of the order of one to several tens of bars); for such detectors, it is usual to utilize a bellows such as 30 and the displacement to be measured is very small. The bellows is coupled in communication with the conduit of the chamber wherein the higher pressure is present. The chamber 36 in which the members of the detector are mounted communicates with the lower pressure. It is constructed in conventional manner.

Figure 2:
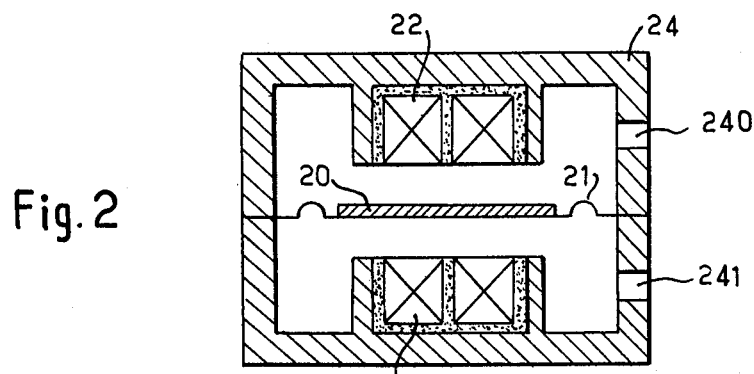
FIG. 2 shows a first manner of construction of the detector member proper, with its two windings opposite to a single metallic element.

It will be noted that, in the construction of FIG. 2, the metallic element 20 need not necessarily move in a direction strictly perpendicular to the axis of the windings: if it is constituted for example of a blade engaged at one end in one of the walls of the chamber 24; in spite of the fact that such a blade deforms and does not undergo a displacement parallel to the axis of the windings, it will be seen that the difference of the peak voltage values corresponding to the two windings remains substantially proportional to the displacement of the free end of the blade.

The circuit of FIG. 2 will be preferred in the majority of applications by reason of the linearity of its response. In the example shown, it can be applied to the measurement of vary low differential pressures, applied through the openings 240 and 241 formed in the wall of the chamber. Nevertheless, the chamber 24 could be constructed to permit the passage for example of a movable rod (or other body) of which one extremity would bear on the mounted blade at its free extremity and the displacement of which would then be measured by the detector. Such an arrangement is described hereinbelow with reference to FIG. 8.

Figure 4:
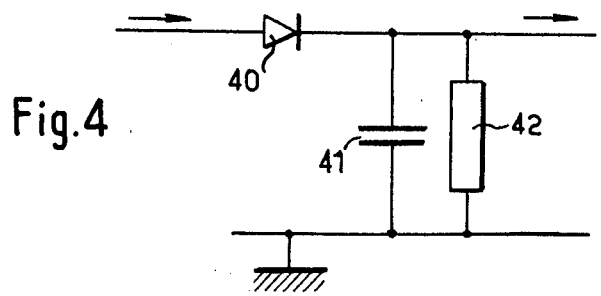
FIG. 4 is a diagram of a peak detector circuit adapted to be used in the device of FIG. 1.

In FIG. 4 there has been shown a peak value detector circuit utilisable for treating the signal coming from the windings. This circuit comprises a diode 40, a condenser 41 and a resistance 42. The signal emitted by this circuit is equal to the value of the peak of the input signal, less the drop of voltage caused by the diode, for example 0.6 V. The capacity C and the resistance R of the components 41 and 42 must be such that RC shall be for example 4 to 5 times greater than the period 1/f of the signal, in such a manner as to obtain a continuous signal at the output of the detector.

Figure 5:
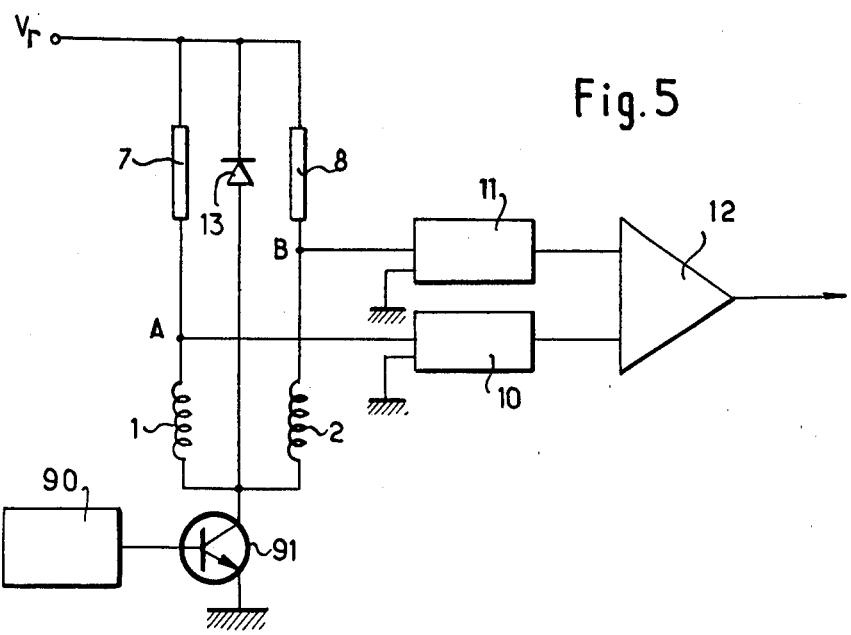
FIG. 5 shows a preferred manner of construction of the detector device of FIG. 1.

In FIG. 5, where there are to be found the same components as in FIG. 1, having the same reference numerals, the generator 9 is constituted by a multivibrator 90 which generates rectangular signals (a, FIG. 6) adapted to periodically unlock a transistor 91. When this latter is locked, the inductances discharge through the diode 13, so that the voltage between the terminals of the transistor (waveform b in full line, FIG. 6) is equal to the continuous reference voltage $V_r$ (8 volts for example), increased by the voltage drop $V_D$ at the terminals of the diode. When the transistor conducts, the voltage between its terminals falls to a very low and well determined level.

The amplitude of the inverted pulses b is thus perfectly defined. The voltage between the point A (or B) and earth, applied to the peak detector (10 or 11) is shown in broken line at b.

During the intervals of conduction of the transistor, the inductances charge up across the resistances, whilst they discharge, in the same direction, across the diode 13 during the intervals of blocking.

Figure 7:
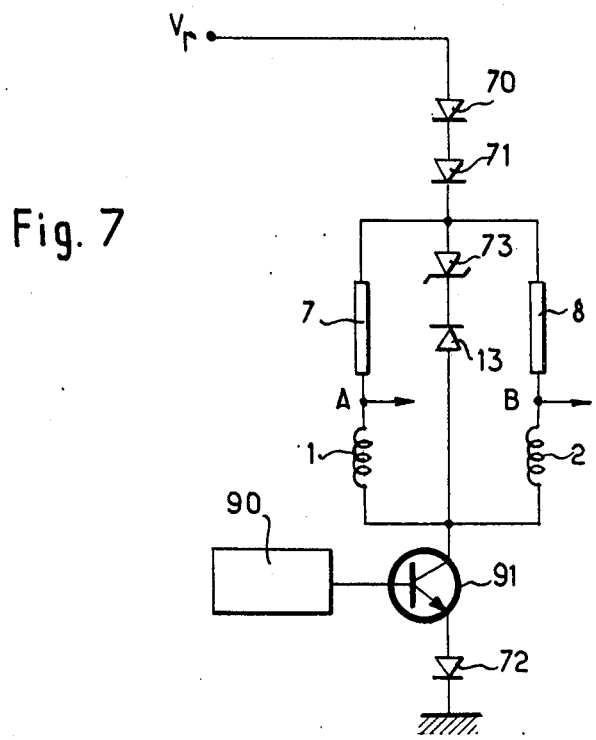
FIG. 7 shows in part a first variant of the circuit of FIG. 5, in which supplementary diodes are intended to compensate for the influence of temperature.

In FIG. 7, there has been shown in part a variation of the circuit of FIG. 5; it will be seen that two diodes 70-71 are inserted between the source Vr and the point of feeding of the resistances 7-8, that a diode 72 is inserted between the emitter of the transistor 91 and earth, and that a Zener diode 73 is inserted between the diode 71 and the diode 13 mounted in reverse direction. It will first of all be explained how the diodes 70-71 and 72 permit a compensation for the influence of temperature on the result of the measurement. In the case of elevation of the temperature, it will be seen that with the circuit of FIG. 5 the voltage generated at the output of the amplifier 12 for a given displacement of the metallic element diminishes (because Vr diminishes). When the detector serves for measuring high pressures and is constructed in accordance with FIG. 3, this loss of gain can be compensated for by increase of the displacement which corresponds to a given pressure, an increase due to the reduction of the module of elasticity of the metal of the bellows 30 caused by the increase of temperature.

On the other hand, with the circuit of FIG. 2, the displacement of the metallic element 20 is practically independent of temperature, the latter being thermally coupled to the housing 24 of the detector. It is then necessary to compensate for the influence of temperature, which is advantageously obtained by causing an increase, at the same time as the temperature, of the charge voltage of each winding across the corresponding resistance.

A first method of obtaining this result consists in adding to the fixed reference voltage Vr an auxiliary voltage increasing as a function of temperature, or stabilising the voltage Vr relative to temperature, which can be obtained by known means.

Figure 6:
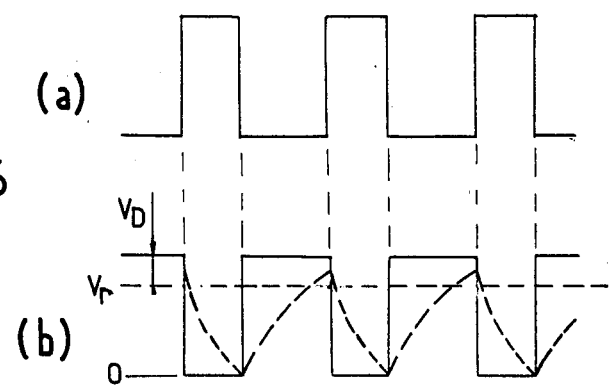
FIG. 6 shows waveforms intended to illustrate the operation of the device.

A second means consists in using the diode 72, the job of which is to cause a decrease, when the temperature increases, of the amplitude which corresponds to the base threshold of the pulses b, FIG. 6 (this amplitude corresponds to the drop of voltage at the terminals of the diode): as a result there is an increase in the peak voltage received at A, and at B. Put in other words, at the same time as the differential voltage, there is also increased the "common mode", which is an inconvenience from the point of view of thermal components, in its elimination by the differential amplifier 12.

A third solution consists in using one or more diodes such as 70-71, FIG. 7, which has the effect of reducing the voltage applied to the feeding point of the resistances 7 and 8 by a value which decreases when the temperature increases. It would naturally be possible to combine the second and the third solutions.

By way of example, using a voltage Vr of 8 V, a detector of the kind described, functioning at a frequency of 80 kHz., will give an output signal of 600 mV (before amplification) for a displacement of 1 millimeter. This very high output permits release from the problems of offset in the amplification.

The insertion of a Zener diode (73, FIG. 7), by considerably increasing the upper threshold of the pulses (b, FIG. 6) again has the effect of multiplying this output by about two times.

Figure 8:
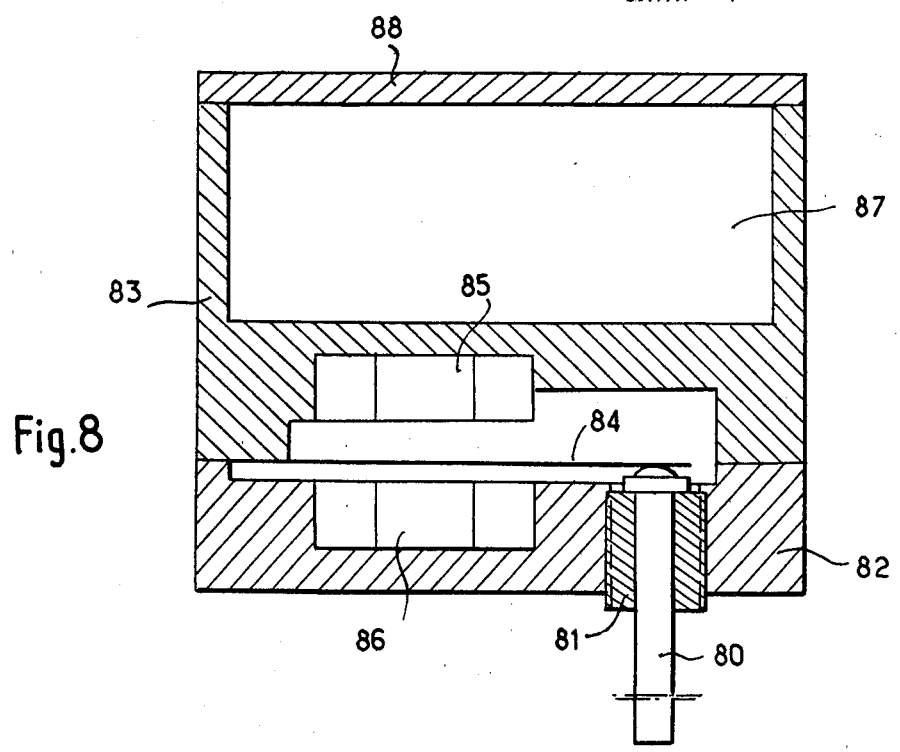
FIG. 8 shows, seen in section, a third manner of construction of the detector member proper, more particularly intended for the measurement of displacements of a pusher element.

In FIG. 8 there has been shown, seen in section, a detector intended to measure the displacements of a pusher element 80 which moves in an adjustable stop 81 integral with the lower body 82 of the detector. Between the lower body 82 and the upper body 83 there is engaged by one end a metallic blade 84 the free end of which follows the displacements of the pusher element 80. Two windings 85 and 86 are disposed one at each side of this blade and form part of an electrical circuit analogous to that which has been described hereinabove. This circuit can be housed in the cavity 87 formed by the upper body and closed by a cover 88. The plate 6 is for example made of beryllium-bronze, and has a thickness of 0.25 millimeters.

It will be apparent that various modifications of construction could be envisaged by the man in the art, without exceeding the scope of the invention.

We claim:

1. Displacement detector comprising two substantially identical windings of which at least one co-operates with a conductive element the displacements of which are to be measured, means for applying to these windings, respectively in series with two resistances, rectangular signals of low frequency, means for detecting the peak values of voltages respectively received at the common points between the respective windings and the corresponding resistances, and means for determining the difference between these peak values, characterised in combination in that the said element is of non-ferromagnetic metal, that the two windings are directly coupled to a common point of application of the said signals, and that a free wheel diode couples the same common point to the common point of the resistances.

2. Displacement detector, according to claim 1, characterised in that the said rectangular signals are generated by a multivibrator and applied to the base of a transistor coupling the common point of the two windings to earth, a continuous reference voltage being applied to the common point of the resistances.

3. Detector according to claim 1 or 2, characterised in that the two windings are mounted in an open Ferrite magnetic circuit.

4. Detector according to one of claims 1 or 2, characterised by a protective screen constituted by an alloy resistant to corrosive fluids and not having any influence of the lines of force, interposed between each winding and the conductive element.

5. Detector according to one of claims 1 or 2, characterised in that the two windings are mounted at one side and the other of a single conductive element which undergoes the displacement to be measured.

6. Detector, according to claim 5, characterised in that the said element is a blade engaged at one extremity and free at its other extremity.

7. Detector according to one of claims 1 or 2, more particularly intended for the measurement of high pressure, characterised by a bellows in communication with the high pressure, two metallic elements of which one is coupled to the movable wall of the bellows and the other is fixed, and two windings co-operating respectively with these two metallic elements.

8. Detector, according to claim 2, characterised by a diode coupled in series between the said transistor and earth.

9. Detector according to claim 2 or 8, characterised by at least one diode coupling the reference voltage to the common point of the resistances.

* * * * *